United States Patent [19]

Dotsko

[11] 4,068,922

[45] Jan. 17, 1978

[54] FRONT PROJECTION SCREEN

[75] Inventor: Martin Dotsko, Binghamton, N.Y.

[73] Assignee: The Singer Company, Binghamton, N.Y.

[21] Appl. No.: 728,606

[22] Filed: Oct. 1, 1976

[51] Int. Cl.² ............................................. G03B 21/60
[52] U.S. Cl. ................................................... 350/126
[58] Field of Search ......................... 350/117, 123–129

[56] References Cited

U.S. PATENT DOCUMENTS

| 1,926,732 | 9/1933 | North ................................... 350/129 |
| 1,942,841 | 1/1934 | Shimizu ................................ 350/128 |
| 2,323,754 | 7/1943 | Oliver .............................. 350/128 X |
| 2,508,058 | 5/1950 | Bradley ......................... 350/117 UX |
| 3,507,548 | 4/1970 | Hoffmann et al. .............. 350/125 X |
| 3,614,199 | 10/1971 | Altman ........................... 350/126 X |
| 3,653,740 | 4/1972 | Ogura et al. ....................... 350/117 |

FOREIGN PATENT DOCUMENTS 540,567 10/1941 United Kingdom ................ 350/126

Primary Examiner—Donald A. Griffin
Attorney, Agent, or Firm—Jeff Rothenberg; James C. Kesterson

[57] ABSTRACT

A cellulose acetate butyrate lacquer film containing minute beads of the clear lacquer is backed by a reflective surface, to form a high resolution front projection screen of selective gain. The gain of the screen depends upon the thickness of the lacquer film and the reflectivity of the backing member.

8 Claims, 7 Drawing Figures

FRONT PROJECTION SCREEN

The invention herein described was made in the course of or under a contract, or a subcontract thereunder, with the Department of the Navy.

BACKGROUND OF THE INVENTION

1. Field of the Invention

This invention relates to projection screens and more particularly, to semi-specular front projection screens for use in visual display systems.

2. Description of the Prior Art

When the projector and an observer of a projected image are located on the same side of a projecting screen, this screen is commonly referred to as a front projection screen. Front projection screens can be classified according to their light reflecting properties, as lambertian, reflex-reflective or semi-specular.

The lambertian screen is coated with a light diffusing material such as a matte white paint. The screen has a generally uniform brightness for all viewing angles and a gain of about one.

Reflex-reflective screens are constructed so that a beam of light incident on the front of the screen is reflected, as a cone of light, back towards the light source, even though the incident beam strikes the screen at an angle. The commonly used, glass beaded screen exhibits such selective light return in the direction of incidence. A glass beaded screen is made of glass beads bonded to a white surface and generally exhibits a gain of 2–3.

As its name implies, the reflection characteristics of a semi-specular screen resemble those of a mirror. The peak luminance with such a screen is in the direction of specular reflectivity. The more specular the screen, the higher will be the gain and directionality of the reflected light.

There are many factors which influence the selection of a projection screen including minimum resolving power, minimum acceptable brightness, and minimum viewing field. Screen selection is often a compromise in which a particular advantage is chosen in spite of accompanying disadvantages. Probably the most important factor in screen selection is the minimum acceptable brightness of the projected image.

Image brightness is, generally, a function of a number of variables including the light output of the projector, the ambient light conditions, the screen gain and the relative locations of the projector, screen and observer. In many cases, the locations of the projector, screen and observer are predetermined and the light flux from the projector is fixed. In these cases, images brightness varies directly as a function of screen gain and ambient light conditions. If the screen gain is restricted to relatively low levels, as it is with most matte white and glass beaded screens, then required image brightness can usually only be obtained in a darkened room. If the gain of the screen can be increased, then the severe restrictions on ambient lighting could be eased.

Theoretically, a mirror (i.e., a purely specular screen) would provide maximum gain and minimum limitations on ambient light conditions. However, a truely specular screen would suffer from severe "fireballing", i.e., the viewer would see an image of the projected light source rather than the projected image.

Semi-specular screens have been designed to provide greater gains with minimal fireballing. A regular surface painted with a metallic paint will function as a semi-specular screen. Another semi-specular screen, employing a multitude of tiny prismatic optical elements mounted on a backing surface, is described in a paper entitled "Bright-Screen Projection Systems for Data Display", by Allan R. Fultz, presented at the 5th Annual Technical Symposium of the Society of Photooptical Instrumentation Engineers, Aug. 4, 1960.

This Fultz paper (Library of Congress Catalog No. TR 16.6 F 959b) contains an excellent discussion of the various optical properties of the different types of front projection screens. It also teaches a host of applications for semi-specular screens. These applications include flight simulation displays, radar displays, airborne visual displays and multiple projector/observer systems. The Fultz paper is incorporated by reference herein to illustrate the state-of-the-art and to indicate the many uses for a semi-specular screen such as that of the present invention.

SUBJECT OF THE INVENTION

According to the instant invention, the restrictions on ambient lighting conditions imposed by conventional matte white and glass beaded screens are overcome by the ability to construct a front projection screen to virtually any desired gain. The "fireballing" evident with highly specular screens is avoided by the use of a diffusing film.

The present invention takes advantage of the highly directional light scattering characteristic of a beaded cellulose acetate butyrate lacquer film to produce a semi-specular front projection screen having a selective gain characteristic. According to the instant invention, a front projection screen is constructed by mounting a beaded film of cellulose acetate butyrate lacquer on a surface having a preselected reflectivity. The gain of the resulting semi-specular projection screen is determined by the reflectivity of the backing surface and the thickness of the beaded film.

One object of the present invention is to provide a semi-specular front projection screen with a highly directional gain characteristic to any desired gain.

Another object is to construct a high gain projection screen which permits visual viewing of a projected image with extremely low levels of incident light.

Still another object is to provide a high gain front projection screen which produces an image of sufficient brightness for visual viewing under high ambient light conditions.

Yet another object is the construction of a highly directional projection screen to minimize light cross-scattering inherent in spherical and other curved visual display systems.

A further object is to provide a semi-specular front projection screen characterized by high resolution and amenable to simple, repeatable fabrication.

A still further object is to provide a composite screen structure which permits precise control of screen gain.

Other objects and advantages of the invention will, in part, be obvious and will, in part, appear hereinafter.

BRIEF DESCRIPTION OF THE DRAWINGS

For a fuller understanding of the nature and objects of the invention, reference should be had to the following detailed description taken in connection with the accompanying drawings in which.

DETAILED DESCRIPTION

Figure 1:
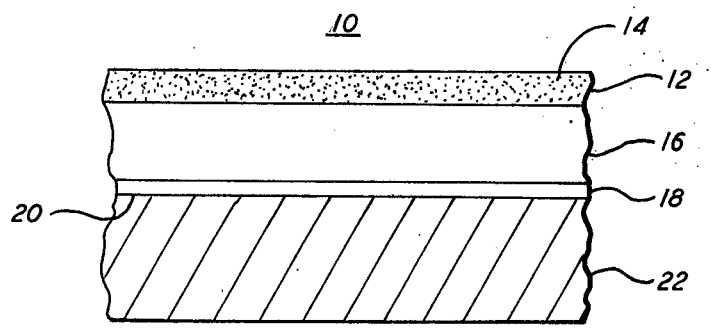
FIG. 1 is an enlarged sectional view of one form of the front projection screen of the instant invention.

A screen 10, constructed according to the principles of the instant invention, is depicted in cross-sectional view in FIG. 1. For the sake of clarity, this screen is shown greatly magnified but not to scale. Projection screen 10 includes a very thin cellulose acetate butyrate lacquer film 12 on its front face. Randomly scattered throughout this film are extremely small spherical beads 14 of clear lacquer. The beaded lacquer film is formed by spraying a plurality of coats of the lacquer onto a transparent plastic sheet 16.

Figure 2:
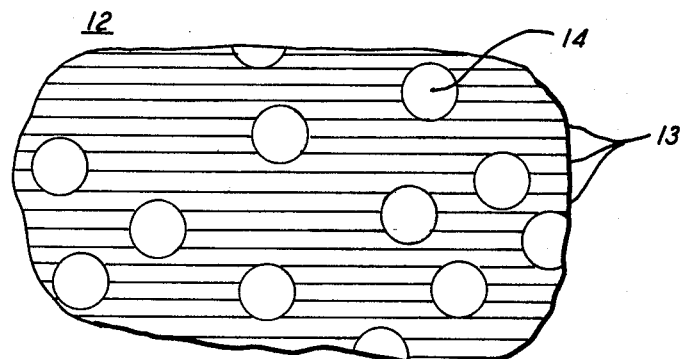
FIG. 2 is a cross-sectional diagram illustrating the beaded nature of the lacquer film used in the instant invention.

The beaded, layered nature of lacquer film 12 is diagrammatically illustrated in FIG. 2. The cellulose acetate butyrate lacquer mixture used and the spraying parameters chosen, are such that as coats 13 of clear lacquer are sprayed one on top of the other, spherical beads 14 are randomly formed throughout the film. These beads are highly reflective and extremely small (the diameter of an average bead is believed to be on the order of 1 micron). The beaded cellulose acetate butyrate lacquer film formed in this manner, has an index of refraction of approximately 1.47-1.5 and acts as a diffusing medium with highly directional light-scattering properties and minimal light-absorbing characteristics.

The chemical formula and a specific example of the preferred lacquer composition follows:

| LACQUER MIXTURE | | |
|---|---|---|
| Ingredient | Parts by Weight | Example (grams) |
| Ethyl Lactate | 3.0 | 38.0 |
| Paraplex G-40 | 1.0 | 12.7 |
| Di-2-Ethylhexyl Phthalate (DOP) | 1.0 | 12.7 |
| Toluene | 2.4 | 30.4 |
| Ethyl Acetate | 2.4 | 30.4 |
| Acetone | 7.6 | 96.3 |
| Cellulose Acetate Butyrate EAB-381-½ | 1.0 | 12.7 |
| Cellulose Acetate Butyrate EAB-381-20 | 1.2 | 15.2 |

| DILUENT MIXTURE | | |
|---|---|---|
| Ingredient | Parts by Weight | Example (grams) |
| Toluene | 5.6 | 177.3 |
| Acetone | 1.4 | 44.3 |
| Ethyl Acetate | 1.0 | 31.7 |

A suitable spraying mixture is formed by mixing 30 parts (by volume) of lacquer mixture with 80 parts (by volume) of diluent mixture.

Although the lacquer coats can be sprayed onto the transparent plastic sheet by hand, I have found it desirable to design an automated spraying machine which assures that the lacquer coats are of uniform thickness and that the lacquer film formation process is repeatable. The transparent plastic sheet is preferably mounted on a constant speed rotating drum so that each spray coating is applied with a uniform thickness. The spraygun nozzle is mounted at a fixed predetermined distance from the transparent sheet (in the example 6-7 inches away), assuring the repeatable formation and deposition of spherical beads of clear lacquer on the plastic sheet. The rotating drum is automated so that only one revolution is made per coating operation. The spraygun is likewise automated so that the spray coating is applied only during the single revolution. The ratio of lacquer mixture to diluent mixture and the spraying parameters are such as to permit a 5-10 second pause between revolutions of the drum. This pause is sufficient to permit the already applied spray coat to dry out sufficiently to permit the application of the next spray coat. As many as 40 spray coats of cellulose acetate butyrate lacquer have been applied in this manner without "wetting out", i.e., without negating the formation of spherical beads. I anticipate that, if desired, even a greater number of spray coats could be applied in this manner.

The lacquer film formed as described above has previously been employed, in a light transmitting mode, to simulate fog. The film is partially reflective and partially transmissive. Both the reflected light and the transmitted light are highly directional. The peak gain of the reflected light is in the direction of specular reflectivity. The percentage of incident light reflected by the film, depends upon the number of coats of lacquer applied. As a general rule, the greater number of coats of lacquer applied, the greater the number of highly reflective beads and, therefore, the higher the reflectance of the film. This latter property is advantageously employed in the instant invention to partially control the gain of a front projection screen.

Returning to FIG. 1, the beaded lacquer film 14 is spray coated onto a transparent plastic sheet 16. Sheet 16 might, for example, comprise a 0.1 mm thick Mylar sheet, having an index of refraction approximately equal to 1.6. Sheet 16 is affixed, with an optical grade cement 18, such as Canadian Balsam, to the front surface 20 of a substrate or backing member 22. The index of refraction of cement 18 closely matches that of transparent sheet 16, so that light transmitted through lacquer film 14 traverses the plastic sheet/cement boundary without being appreciably refracted.

Backing member 22 affords a second means for controlling the gain of screen 10. Light transmitted through film 14, impinges upon surface 20 of member 22. Some portion of the impinging light will be reflected by this surface back through the lacquer film and secondarily scattered by the lacquer film back to the observer; the extent of the returned light depending primarily upon the degree of reflectivity of surface 22. Since the film and reflecting surface are closely spaced, the reflected, secondarily scattered light rays reinforce those light rays initially scattered back towards the observer by the film lacquer, producing an increase in image brightness. Thus, by varying the reflectivity of surface 20, the gain from screen 10 can be controlled.

Substrate 22 could, for example, comprise a .8 mm thick aluminum plate. This plate can be flat or curved, with its front surface polished to reflect light rays. The reflectivity of surface 20 can be controlled by a known polishing operation utilizing various grit polishing compounds. If surface 20 is highly polished, screen 10 will have a correspondingly high gain. A duller finish will produce a relatively lower gain. Of course, other substrates with varying degrees of reflectivity can also be used. If, for example, a gain of less than 1 is desired, a neutral density filter could be used as the backing member.

Figure 3:
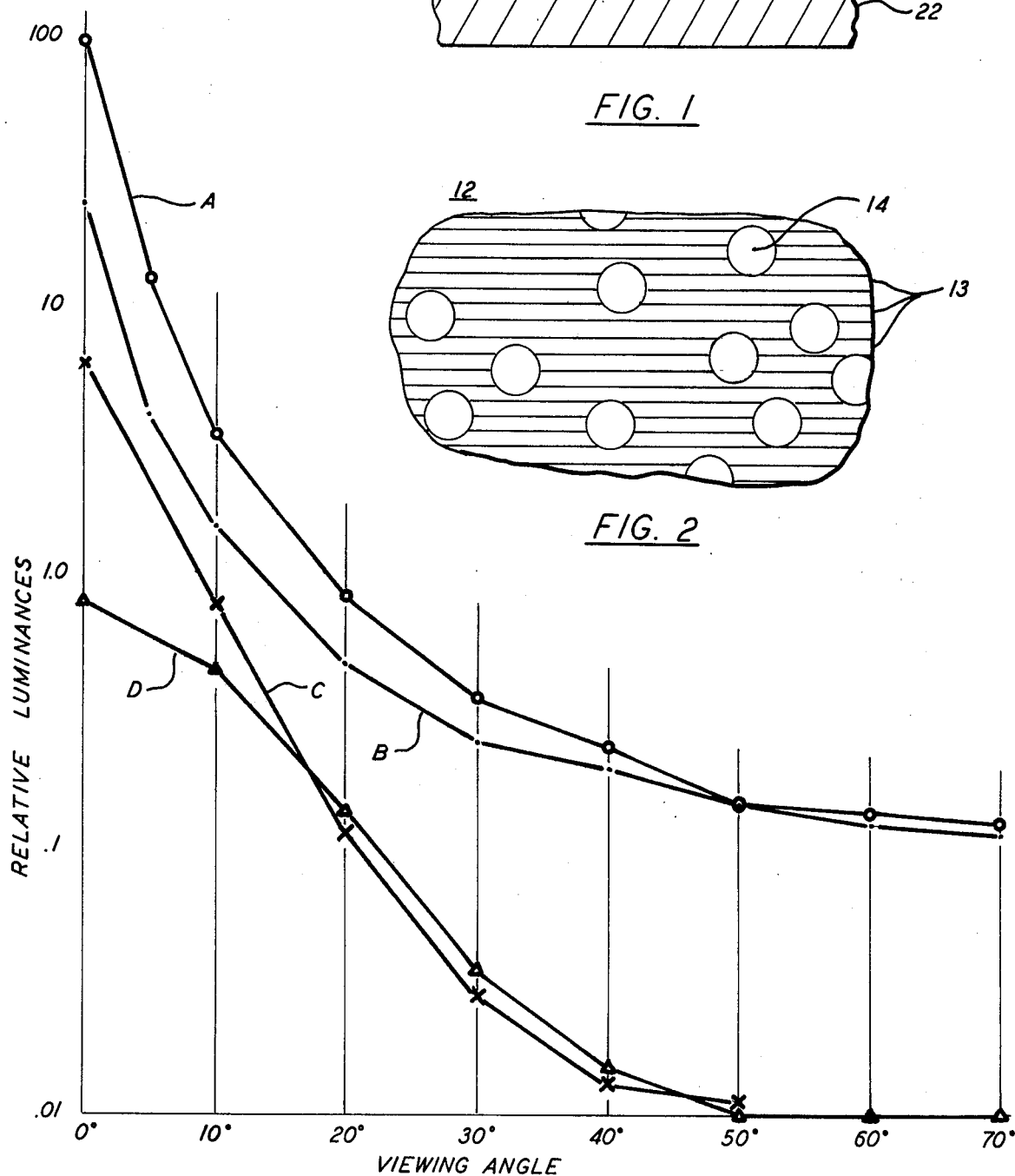
FIG. 3 is a family of curves illustrating how screen luminance at different viewing angles varies with the reflectivity of the backing material.

The curves of FIG. 3 illustrate how the gain of the front projection screen of the instant invention can be controlled by varying the reflectivity of the backing member. In FIG. 3, the relative luminance of four samples, at various viewing angles, is plotted. These measurements were taken by projecting a light beam onto each sample, along a normal to that sample. The light reflected from the sample was then measured at different angles in a horizontal plane, at a fixed distance from said sample.

A viewing angle of 0° corresponds to a position perpendicular to the sample surface. Relative luminance is the ratio between the measured photometric brightness of the sample and the photometric brightness of a standard diffuser, carbonate of magnesia. The gain of a particular sample is its relative luminance at a viewing angle of 0°.

The samples tested all included a mylar sheet having a 40-coat lacquer film sprayed thereon. The mylar sheet was 100 microns thick while the lacquer film was about 12 microns thick. Curve A represents the relative luminance of a sample backed by a bright aluminum plate. The gain of this sample was a phenomenal 98. A dull aluminum plate produced curve B and a gain of 23. Curve C represents the brightness characteristics of the lacquer film/mylar sheet combination in an air continuum. Note that without any special backing member the lacquer film on the mylar sheet has a gain of around 6. The low gain (0.8) of curve D was obtained by using an 8.0 neutral density glass filter as the backing member. It should be evident from these curves that by judicious choice of the backing member and/or selective control of the reflectivity of the front surface of this member, the gain of the instant projection screen can be controllably varied over a remarkably wide range.

The fine tuning of screen gain provided by the dual controls (film thickness and a substrate reflectivity) of the instant invention permit the construction of a screen precisely suited for a particular application.

In comparison to the standard glass beaded screen, the front projection screen of the instant invention not only provides significantly higher gains but also exhibits higher resolving power, and greater contrast ratio under conditions of significant light cross-scattering (e.g., with a spherical screen). It is believed that the improved resolution is due to the extremely fine size of the clear lacquer beads, while the greater contrast ratio is attributed to the highly directional light-scattering properties of the lacquer film.

In operation, a projected image is focused on the front surface of the projection screen, with the plane of focus being at the cellulose acetate butyrate lacquer film. By virtue of the highly directional light-scattering properties of this film, the brightest image will be viewed by an observer positioned at the angle of reflectance. The highly directional light transmitted by the lacquer film is reflected off the reflecting surface positioned close to the plane of focus. These light rays will now pass back through the lacquer film and tend to add to those light rays reflected by the film. The end result is an increase of image brightness as viewed by the observer, with no noticable degradation of image quality.

By virtue of the ability to control the ratio of light transmitted versus light reflected by the lacquer film by varying the number of spray coats of lacquer applied to the transparent plastic sheet, a first means of controlling the number of light rays reaching the observer is provided. By virtue of the ability to control the reflectivity of the reflecting surface, a second means of controlling image brightness is provided. In concert, these two control means allow one to very finely tune the gain of a front projection screen constructed according to the principles of this invention.

Figure 4:
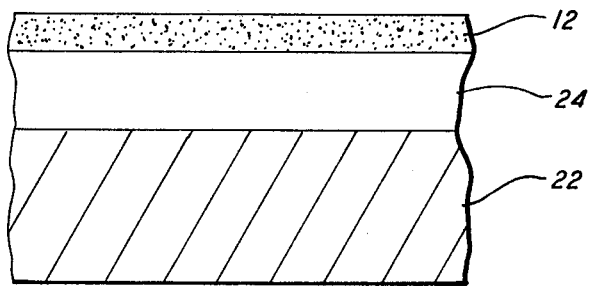
FIGS. 4-7 illustrate alternative constructions of the front projection screen of the instant invention.
Figure 5:
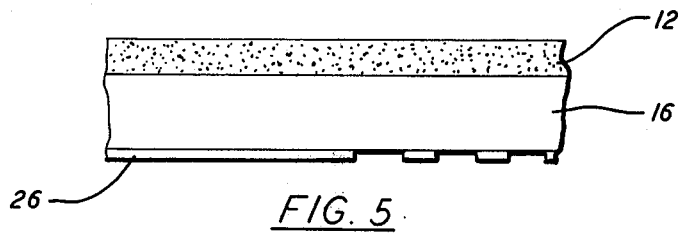

FIGs. 4–7 depict alternate embodiments of the novel front projection screen. In FIG. 4, the optical grade cement is eliminated by spraying a transparent plastic material 24, such as clear epoxy paint, directly onto the front surface of substrate 22. The lacquer coats are then sprayed onto the front surface of plastic layer 24.

Instead of using a preformed reflecting substrate, a reflecting surface can be applied directly to the back surface of sheet 16. For example, in FIG. 5, a metallic paint 26 is shown sprayed on the back surface of preformed plastic sheet 16. The porosity of density of the reflecting material 26 is used to control the reflectivity and thus gain of the screen.

Figure 6:
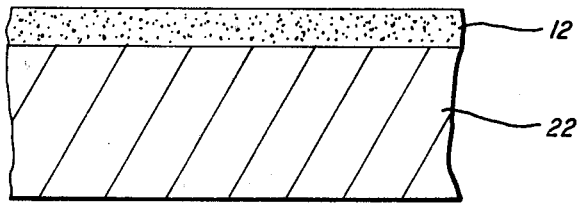
Figure 7:
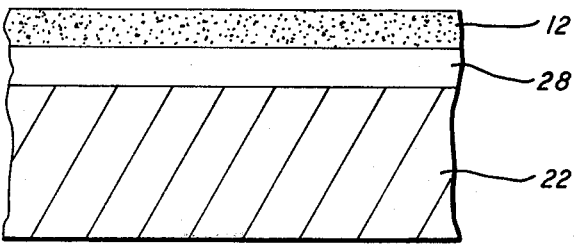

FIG. 6 depicts a simplified embodiment of the invention wherein the lacquer film 12 is sprayed directly onto the front reflective surface of substrate 22. In FIG. 7, a reflective coating 28, e.g., a silver lacquer, is first sprayed on the front surface of substrate 22 and then the coats of cellulose acetate butyrate lacquer are applied on top of this reflective coating.

The invention described herein provides significant advantages over the prior art. It permits the construction of a semi-specular front projection screen with a highly directional gain characteristic to any desired gain. The higher screen gains attainable by the approach described herein permit visual viewing of a projected image with extremely low levels of incident light and/or under high ambient light conditions. Further, a screen constructed according to the principles of this invention, exhibits improved resolution and minimal fireballing, and effectively eliminates the light cross-scattering and image "washout" often experienced in spherical visual display systems.

Various modifications to the described embodiments, which preserve the significant advantages of the instant invention and fall within the scope of the attached claims, will suggest themselves to those of ordinary skill in this art.

What I claim is:

1. A semi-specular front projection screen of selective gain comprising:

a beaded film of cellulose acetate butyrate lacquer having a highly directional light scattering characteristic, said film comprising a plurality of spray coats of said lacquer with lacquer beads distributed throughout, said spray coats being derived from a spraying mixture formed by mixing 30 parts, by volume, of the following lacquer mixture:

| Ingredient | Parts by Weight |
| --- | --- |
| Ethyl Lactate | 3.0 |
| Paraplex G-40 | 1.0 |
| Di-2 Ethylhexyl Phthalate (DOP) | 1.0 |
| Toluene | 2.4 |
| Ethyl Acetate | 2.4 |
| Acetone | 7.6 |

| Ingredient | Parts by Weight |
| --- | --- |
| Cellulose Acetate Butyrate EAB-381-½ | 1.0 |
| Cellulose Acetate Butyrate EAB-381-20 | 1.2 | with 80 parts by volume of the following diluent mixture:

| Ingredient | Parts by Weight |
| --- | --- |
| Toluene | 5.6 |
| Acetone | 1.4 |
| Ethyl Acetate | 1.0; and | a backing member having a light reflective surface adjacent said film, the thickness of the film and the degree of reflectivity of said surface being variable to control the gain of said screen.

2. The screen of claim 1 wherein said backing member comprises an aluminum plate.

3. The screen of claim 1 wherein said backing member comprises a substrate with a reflective coating thereon.

4. The screen of claim 1 further including a layer of transparent plastic material sandwiched between said lacquer film and the reflective surface.

5. The screen of claim 4 further including an optical grade cement affixing said plastic material to said reflective surface, said plastic material and cement having closely matching indices of refraction.

6. The screen of claim 4 wherein said plastic material comprises a preformed sheet of plastic and said backing member comprises a coating of reflective material on the back surface of said plastic sheet.

7. A semi-specular front projection screen of selective gain comprising:
   a beaded film of cellulose acetate butyrate lacquer having a highly directional light scattering characteristic;
   a backing member having a light reflective surface adjacent said film, the thickness of the film and the degree of reflectivity of said surface being variable to control the gain of said screen;
   a layer of transparent plastic material sandwiched between said lacquer film and the reflective surface; and
   an optical grade cement affixing said plastic material to said reflective surface, said plastic material and cement having closely matching indices of refraction.

8. A method of constructing a semi-specular front projection screen of selective gain, comprising the steps of:
   forming a beaded film of cellulose acetate butyrate lacquer having a highly directional light scattering characteristic by overlaying spray coats of said lacquer, said spray coats being derived from a spraying mixture formed by mixing 30 parts, by volume, of the following lacquer mixture:

| Ingredient | Parts by Weight |
| --- | --- |
| Ethyl Lacetate | 3.0 |
| Paraplex G-40 | 1.0 |
| Di-2-Ethylhexyl Phthalate (DOP) | 1.0 |
| Toluene | 2.4 |

| Ingredient | Parts by Weight |
| --- | --- |
| Ethyl Acetate | 2.4 |
| Acetone | 7.6 |
| Cellulose Acetate Butyrate EAB-381-½ | 1.0 |
| Cellulose Acetate Butyrate EAB-381-20 | 1.2 | with 80 parts by volume of the following diluent mixture:

| Ingredient | Parts by Weight |
| --- | --- |
| Toluene | 5.6 |
| Acetone | 1.4 |
| Ethyl Acetate | 1.0 | backing the lacquer film with a light reflective surface; and controlling the thickness of said film and degree of reflectivity of said surface to produce a desired screen gain.

* * * * *